United States Patent
Sayyed et al.

(10) Patent No.: US 11,307,844 B2
(45) Date of Patent: Apr. 19, 2022

(54) SYSTEM AND METHOD FOR INTELLIGENT POWER MANAGEMENT OF FIRMWARE UPDATES

(71) Applicant: DELL PRODUCTS, LP, Round Rock, TX (US)

(72) Inventors: Ibrahim Sayyed, Georgetown, TX (US); Zhao Hui Yu, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 122 days.

(21) Appl. No.: 16/905,668

(22) Filed: Jun. 18, 2020

(65) Prior Publication Data
US 2021/0397440 A1    Dec. 23, 2021

(51) Int. Cl.
*G06F 8/65* (2018.01)
*G06F 8/654* (2018.01)
*G06F 1/3206* (2019.01)
*G06F 9/4401* (2018.01)

(52) U.S. Cl.
CPC ............ *G06F 8/654* (2018.02); *G06F 1/3206* (2013.01); *G06F 9/4401* (2013.01)

(58) Field of Classification Search
CPC ....................................................... G06F 8/65
See application file for complete search history.

(56) References Cited

U.S. PATENT DOCUMENTS

| 10,389,851 B2 | 8/2019 | Ganesan et al. |
| 2010/0145643 A1* | 6/2010 | Katpelly ................. G06F 1/329 702/63 |
| 2016/0020624 A1* | 1/2016 | Chang ................... H02J 7/0077 320/136 |
| 2019/0058340 A1* | 2/2019 | Park ......................... H02J 7/04 |
| 2020/0409678 A1* | 12/2020 | Ju ............................ G06F 21/57 |

FOREIGN PATENT DOCUMENTS

JP    6272991 B2    1/2018

* cited by examiner

*Primary Examiner* — Jae U Jeon
(74) *Attorney, Agent, or Firm* — Larson Newman, LLP (57) ABSTRACT

An information handling system includes power inputs, a battery, a BMC, a memory, and a processor. The BMC determines which of the power inputs are coupled to associated power sources, and a first duration of time that the battery can provide power to the information handling system. The memory stores a firmware element. The processor receives a firmware that includes a second indication as to which of the power inputs are to be coupled to their associated power source as a condition for saving the firmware update, and that includes a second duration of time that it is expected to take to save the firmware update. The information handling system saves the firmware update to the memory when the first indication matches the second indication and when the first duration of time is greater than the second duration of time.

20 Claims, 4 Drawing Sheets

SYSTEM AND METHOD FOR INTELLIGENT POWER MANAGEMENT OF FIRMWARE UPDATES

FIELD OF THE DISCLOSURE

This disclosure generally relates to information handling systems, and more particularly relates to intelligent power management of firmware updates in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a BMC that determines which power inputs are coupled to associated power sources, and a first duration of time that a battery can provide power to the information handling system. A processor may receive firmware that includes a second indication as to which of the power inputs are to be coupled to their associated power source as a condition for the processor to save the firmware update, and that includes a second duration of time that it is expected to take to save the firmware update. The information handling system may save the firmware update to the memory when the first indication matches the second indication and when the first duration of time is greater than the second duration of time

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
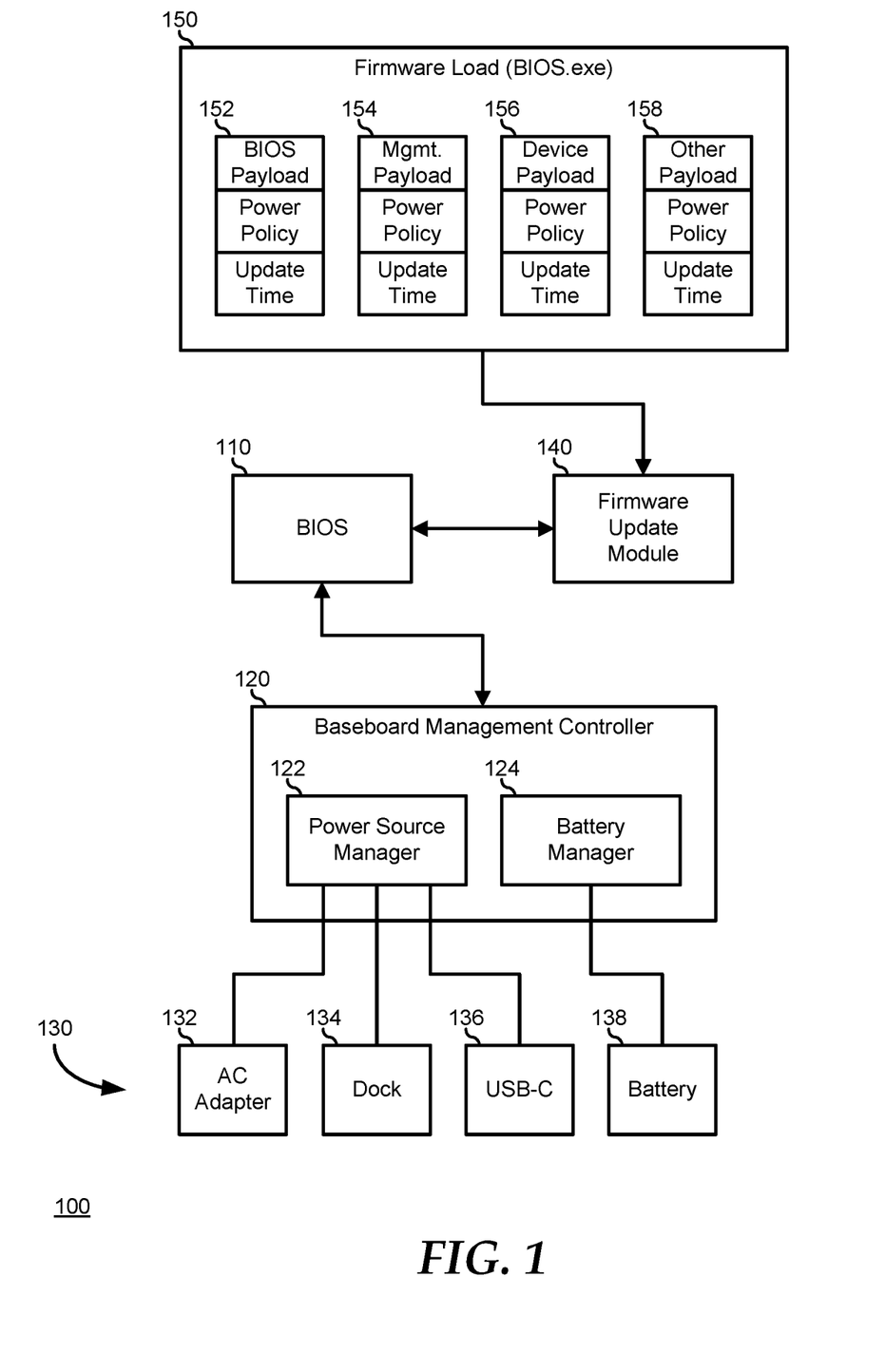
FIG. 1 is a block diagram illustrating an information handling system according to an embodiment of the present disclosure.

FIG. 1 illustrates an information handling system 100 including a system Basic Input/Output System (BIOS) 110, a baseboard management controller 120, power sources 130, a firmware update module 140, and a firmware load 150, and power sources 150. Information handling system 100 represents a computer system for general purpose data processing and will be understood to include a host processing complex that includes additional hardware and software features to implement the functions and features as described herein. For example, a host processing complex may be understood to include central processing units (CPUs), short term memory devices such as Random Access Memory (RAM) devices, Non-Volatile RAM (NVRAM) devices, and the like, long term memory devices such a Read Only Memory (ROM) devices, Flash memory devices, and the like, data storage devices such as disk drive storage devices, Solid State Drive (SSD) storage devices, and the like, and input/output devices, such as Human Interface Devices (HIDs), network adapters, Universal Serial Bus (USB) devices and interfaces, and the like.

BIOS 110 represents code executed by information handling system 100 during a system boot process to detect the hardware and software elements of the information handling system, to initialize the hardware elements, and to launch an operating environment, such as an Operating System (OS), a Virtual Machine Manager (VMM), or the like, to take over run time operation of the information handling system. In addition, during the run time operation, BIOS 110 operates to monitor, manage, and maintain system level operations of information handling system 100, such as the operation of the HIDs and storage devices of the information handling system. In some cases, such as where BIOS 110 represents a Unified Extensible Firmware Interface (UEFI), the BIOS also handles the installation, configuration, and management of various device drivers associated with the hardware and software elements of information handling system 100. Further, the hardware and software element of information handling system 100 may implement their own firmware, either as code that is launched and called upon by BIOS 110, or as code stored in various non-volatile memory devices of the information handling system or the hardware elements installed thereon. For example, various devices may include a device ROM that non-volatilely stores the drivers for the respective devices. Here, during the system boot process, BIOS 110 may operate to read and store the contents of the device ROM to a memory location within a faster memory device, to improve the overall performance of information handling system 100. BIOS 110 also operates to provide updates to the various firmware elements within information handling system 100 in conjunction with firmware update module 140 and firmware load 150, as described further below.

BMC 120 represents a management processing complex that is separate from the host processing complex hardware and software elements of information handling system 100. Here, the host processing complex will be understood to be utilized to provide the processing functions and features typically associated with the operation of a computer, such as those functions and features that may be provided within the operation of an OS, a VMM, or the like. In contrast, the management processing complex may include one or more processing devices, such as a dedicated baseboard management controller (BMC) System-on-a-Chip (SoC) device, one or more associated memory devices, one or more network interface devices, a complex programmable logic device (CPLD), and the like, that operate together to provide a management environment for information handling system 100. In particular, BMC 120 may be connected to various components of the host processing complex via various internal communication interfaces, such as a Low Pin Count (LPC) interface, an Inter-Integrated-Circuit (I2C) interface, a Peripheral Component Interconnect-Express (PCIe) interface, or the like, to provide an out-of-band (OOB) mechanism to retrieve information related to the operation of the host processing complex, to provide BIOS/UEFI or system firmware updates, to manage non-processing components of information handling system 100, such as system cooling fans and power supplies. An example of BMC 120 may include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like.

Power sources 130 represent the various mechanisms whereby information handling system 100 receives power, and include an AC adapter 132, a dock station 134, a USB-C connector 136, and a battery 138. AC adapter 132 represents a power supply device that receives power from a power grid, typically operating at a particular Alternating Current (AC) voltage level, and to convert the power from the grid to a Direct Current (DC) voltage level that is more directly utilized by information handling system 100. Dock station 134 represents a device into which information handling system 100 can be installed, and which provides various services to the information handling system. The services may include offloading of HID functions from information handling system 100, additional data storage capacity, and the like. In addition, dock station 134 may include a power supply device similar to AC adapter 132. Here, the DC voltage provided by dock station 134 is typically the same as that supplied by AC adapter 132, the only difference being that the power connector for dock station 134 is integrated with other connectivity provided by the dock station. USB-C connector 136 represents a USB interface receptacle configured to receive a USB-C plug, and, where a device connected to the USB cable is configured to provide power through its USB connection, to receive power from the connected device. Here, USB-C connector 136 will typically be configured to receive power at 5 volts DC, but may be configurable to receive power at up to 20 volts DC, as needed or desired. Battery 138 represents a rechargeable power storage device that is typically integrated with information handling system 100 to provide power for the information handling system when none of the other power sources are connected to the information handling system. It will be understood that power sources 150 may include one or more additional input for receiving system power, as needed or desired.

Power sources 130 each operate to provide an indication as to whether or not each particular power source is currently providing power to information handling system 100, and may provide additional information, as needed or desired. The indications and additional information are provided to BMC 120, and the BMC operates to manage the power provided by power sources 130, as needed or desired. Here, power sources 130, as illustrated, are representative of their capacities to provide information to BMC 120, and not in their capacities to provide power to information handling system 100.

BMC 120 includes a power source manager 122 and a battery manager 124. Power source manager 122 operates to receive the indications and information from AC adapter 132, dock station 124, and USB-C connector 126. Here, power source manager 122 may include one or more switching element that operate to select one of AC adapter 132, dock station 134, and USB-C connector 136 when two or more of the power sources are connected to information handling system 100. For example, if information handling system 100 is docked in docking station 134 and is also connected to a USB device configured to provide power via USB-C connector 136, power source manager 122 may be configured to select to receive power from dock station 134 in preference over power from USB-C connector 136. Battery manager 124 operates to receive a power level indication from battery 138, and to calculate an estimate of the amount of time that information handling system 100 can continue to operate on power exclusively provided from the battery. In addition, battery manager 124 operates to determine a percentage charge on battery 138, a charging status for the battery, and other information, as needed or desired.

Firmware update module 140 represents code configured to receive firmware updates and to apply the firmware updates to information handling system 100. For example, where a hardware element of information handling system 100 includes a firmware ROM, firmware update module 140 may operate to provide security credentials to unlock a re-write capability of the non-volatile storage device in order to be able to store the new firmware into the firmware ROM. Then firmware update module 140 may operate to provide a reset to the hardware element, such as a bus reset or a power cycle reset for the hardware element, such that when the hardware element is powered up, the new firmware image is executed. In another example, where a firmware element is stored in the BIOS ROM of information handling system 100, firmware update module 140 may operate to provide the firmware update in a non-volatile memory device of information handling system 100, and direct BIOS 110 to provide a power cycle reset of the information handling system, such that, on the subsequent system boot process, the BIOS can unlock the re-write capability of the BIOS ROM to store the firmware update into the BIOS ROM and execute the updated firmware.

In a particular embodiment, firmware update module 140 is included in BIOS 110. In another embodiment, firmware update module 140 is a general-purpose module that can be utilized to update firmware in a wide variety of hardware elements of information handling system. In particular, firmware update module 140 operates to receive one or more firmware updates in firmware load 150, and the firmware update module operates to successively install the firmware updates with the firmware load. Thus, as illustrated, firmware load 150 includes a firmware update for the system BIOS 152, a firmware update for the management processing environment 154, a firmware update for a particular device 156, and one or more additional firmware updates 158. In a particular embodiment, firmware load 150 represents a stand-alone executable program provided, for example, by a manufacturer of the particular hardware element, and may include the functionality of firmware update module 140. The details of firmware updates, both at the system level and at the device level, are known in the art and will not be further described herein except as needed to illustrate the current invention.

It has been understood by the inventors of the current invention that a typical firmware update process will perform a simple power source check to determine whether or not an information handling system is being powered by a reliable power source (e.g., an AC adapter or docking station). However, it has been further understood that, where a firmware update process is initiated while the information handling system is being powered by a reliable power source, but where the information handling system is disconnected from the reliable power source mid-way through the firmware update process, the incomplete firmware update process may result in corruption of the firmware image of the target device because the firmware code may be only partially written to the ROM before power is lost. This problem may be exacerbated when multiple firmware images are being updated at one time, such as with firmware load 150.

In a particular embodiment, firmware updates 152, 154, 156, and 158 each include an associated power policy and an estimated update time. The power polices each define a set of power supply conditions that are to be followed prior to the execution of the firmware update for the associated element. For example, some elements of information handling system 100 may have a unified storage area for the associated firmware. Here, the risk of power loss would mean that partially written firmware updates would likely result in corruption and the loss of functionality of the particular elements. Here further, it may be desirable for the associated power policy to specify that, in addition to ensuring that the information handling system is being powered by a reliable power source, the battery of the information handling system retains sufficient charge to continue the firmware update process to completion in the case of loss of power on the reliable power source. Here, the amount of time may be determined based upon the estimated update time for the particular firmware update. In another example, some elements of information handling system 100 may include redundant storage areas, a first area being reserved to store a currently operating firmware image, and a second area being reserved in normal operation to store a previous version of the firmware image, and reserved in a firmware update process to store the new firmware image. Here, it may be less critical that there be sufficient charge in the battery to continue the firmware update to completion in the case of loss of power on the reliable power source. As such, the power policy may specify that connection to the reliable power source is sufficient, and that the update is not predicated on any particular charge level or estimated time for the update.

In a particular embodiment, information handling system 100 operates to schedule and run firmware updates based upon the predicted update time for firmware updates, and the estimate of the amount of time that information handling system 100 can continue to operate on power exclusively provided from battery 138. In a first case, firmware update module 140 operates to gather the power policies and predicted update times from firmware load 150, and to receive the power source information and battery status information from BMC 120. Then firmware update manager 140 operates to determine if the policies of the firmware updates are satisfied, and, where such policies demand battery back-up, whether or not the battery carries a sufficient charge to back up the firmware update process. If the policies of the firmware updates are satisfied, and the battery carries a sufficient charge to back up the firmware update process, then firmware update module 140 proceeds with the firmware updates. Here, firmware update module 140 operates to query BIOS 110 to request the power source information and battery status information from BMC 120. In this case, firmware module 140 may retrieve the individual power policies and predicted update times from firmware load 150 and calculate an overall policy and predicted update time for performing the firmware updates, or firmware load 150 may be preconfigured to provide the overall policy and predicted update time for performing the firmware updates. In this case, a platform BIOS and management processing complex may be implemented without regard to the power and time constraints on firmware updates, and so the firmware update module as described in this case may be utilized on information handling systems that do not otherwise support taking power and time considerations into the firmware update process.

In another case, BIOS 110 operates to receive the power policies and predicted update times from firmware update module 140, and to receive the power source information and battery status information from BMC 120. Then BIOS 110 operates to determine if the policies of the firmware updates are satisfied, and, where such policies demand battery back-up, whether or not the battery carries a sufficient charge to back up the firmware update process. If the policies of the firmware updates are satisfied, and the battery carries a sufficient charge to back up the firmware update process, then BIOS 110 directs firmware update module 140 to proceed with the firmware updates.

In a third case, BMC 120 operates to receive the power policies and predicted update times from firmware update module 140, and to determine if the policies of the firmware updates are satisfied, and, where such policies demand battery back-up, whether or not the battery carries a sufficient charge to back up the firmware update process. If the policies of the firmware updates are satisfied, and the battery carries a sufficient charge to back up the firmware update process, then BMC 120 directs firmware update module 140 to proceed with the firmware updates via BIOS 110.

In a particular embodiment, when one or more of the policies of the firmware updates are not satisfied, or the battery does not carry a sufficient charge to back up the firmware update process, then one or more of firmware update module 140, BIOS 110, and BMC 120 operates to determine if a subset of the firmware updates may yet be performed. That is, rather than deciding whether or not to perform all firmware updates, each individual power policy and predicted update time can be considered. In this case, it may turn out that all of the firmware updates get executed in spite of the fact that all of the power policies were not satisfied or that the battery did not carry sufficient charge. For example, if the battery is determined to not carry sufficient charge to back up all firmware updates, it may yet carry sufficient charge to back up each individual firmware update performed alone. Here, if the primary power source is never disconnected during the firmware update process, then, by deciding individually for each firmware update, at each decision point the battery may be determined to carry enough charge to back up that firmware update, and so, in the end, all of the firmware updates wind up being executed, in spite of there being insufficient charge to back up all of the firmware updates.

Figure 2:
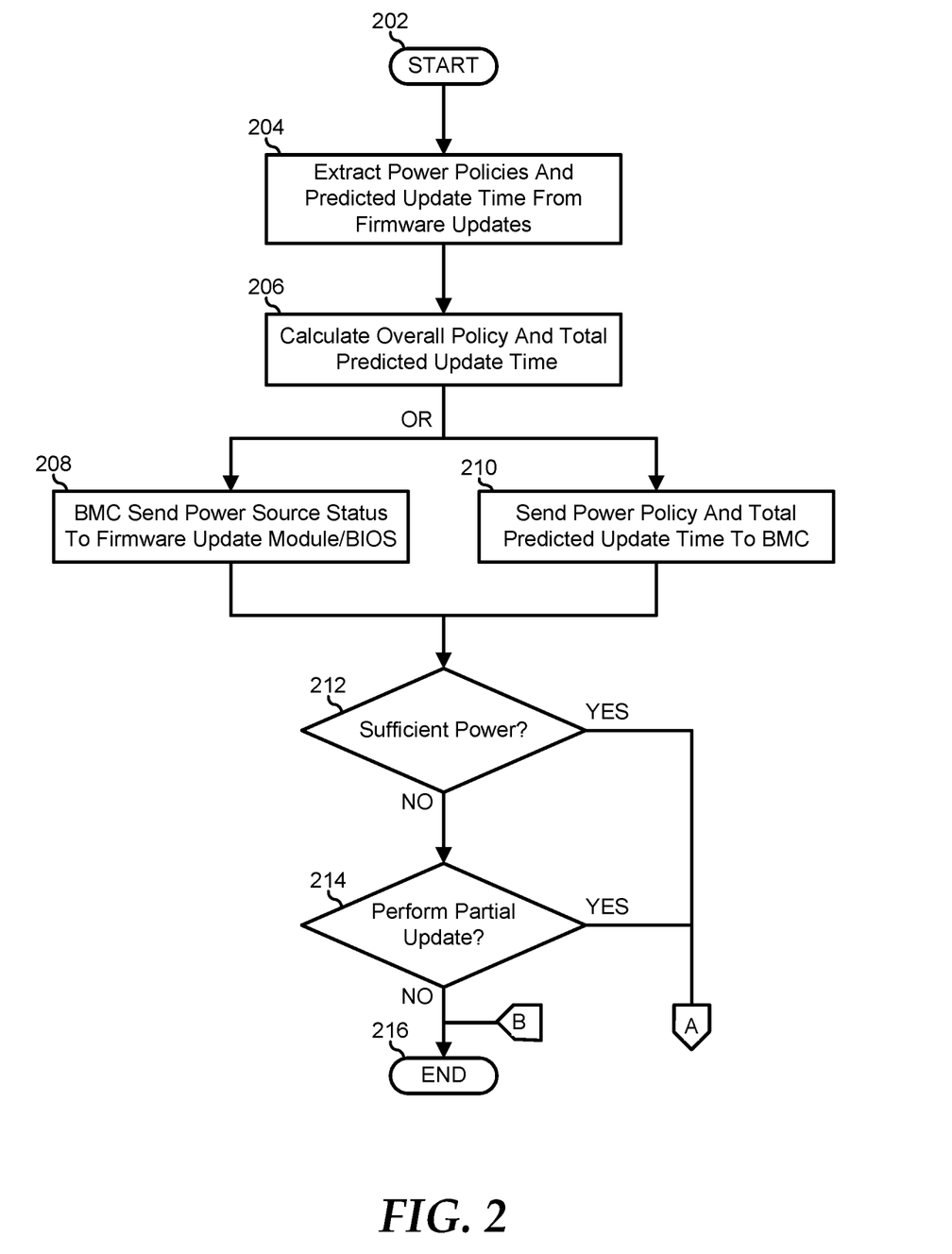
FIGS. 2 and 3 are flowcharts illustrating a method for intelligent power management of firmware updates in an information handling system, according to an embodiment of the present disclosure.
Figure 3:
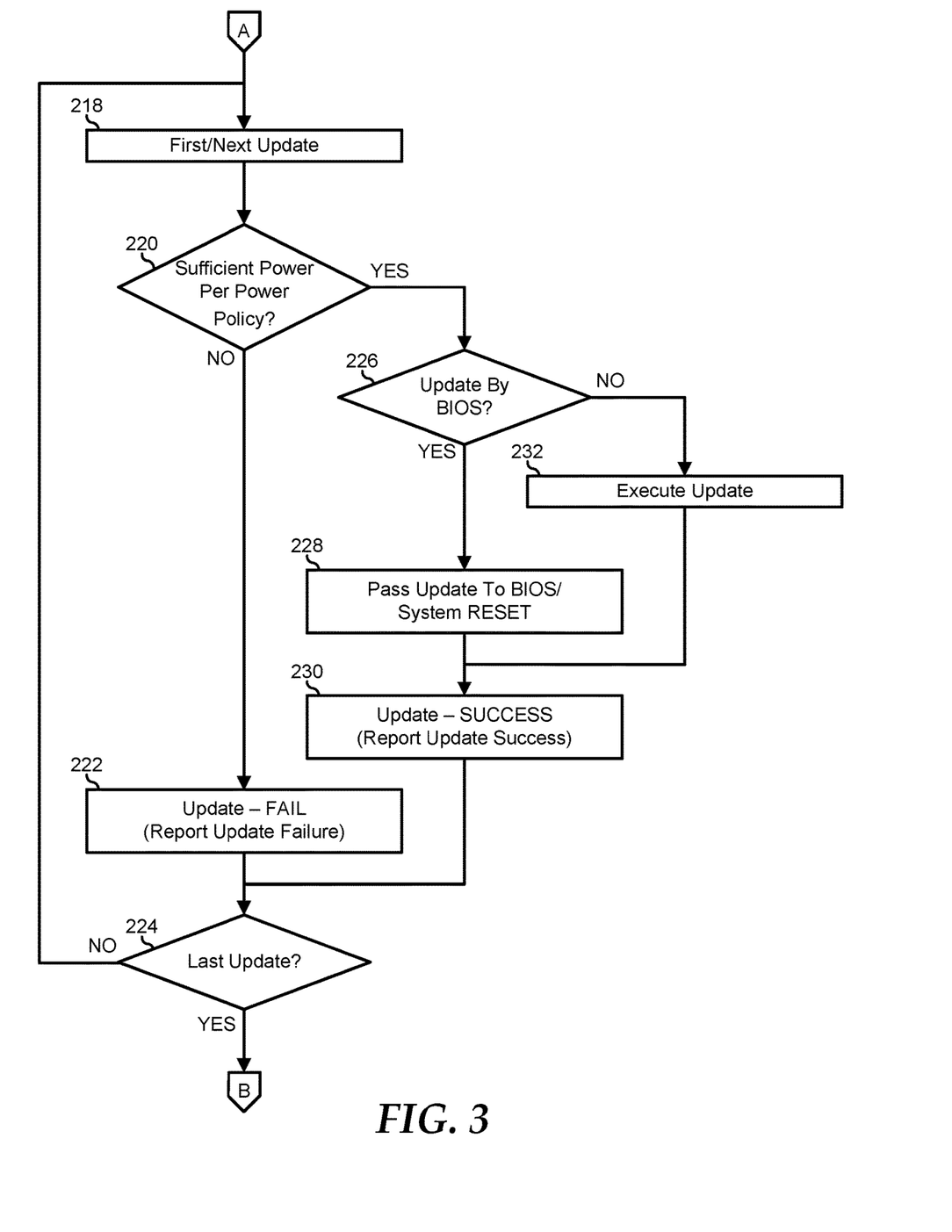

FIGS. 2 and 3 illustrate a method for intelligent power management for firmware updates, starting at block 202. The power policies and predicted update times for the firmware updates are extracted from a firmware load in block 204. Here, the firmware load can be an executable file that operates to provide the power policies and predicted update times to a system BIOS, or a firmware update module, the system BIOS, or a BMC can read the contents of the firmware load to extract the power policies and predicted run times. An overall power policy and a total predicted update time for all of the firmware updates in the firmware load are calculated in block 206. Here, where the firmware load is an executable file, the firmware load itself can be created with a predetermined overall power policy and total run time.

In a first embodiment, the power source status information is requested from the BMC, and the BMC sends the power source status information to the BIOS or to the firmware update module via the BIOS in block 208. Here, the power source status information can include an indication as to which outside power sources are connected to the information handling system, and a battery life indication, an expected battery run time indication or the like. In a second embodiment, the overall power policy and the total predicted update time are provided to the BMC in block 210. A decision is made as to whether or not the overall power policy and total predicted update time are satisfied based upon the power source status information in decision block 212. Here, the decision may be made by one of the firmware update module, the BIOS, or the BMC, in accordance with which one of blocks 208 and 210 are executed. If the overall power policy and total predicted update time are satisfied, the "YES" branch of decision block 212 is taken and the method proceeds to block 218, as described further below. If either the overall power policy or total predicted update time are not satisfied, the "NO" branch of decision block 212 is taken and a decision is made as to whether or not a partial firmware update is desired in decision block 214. Here, for example, when either the overall power policy or total predicted update time are not satisfied, and the "NO" branch of decision block 212 is taken, an indication can be provided that the complete firmware update may not be able to be applied, and a user can be given a choice as to whether or not to perform a partial firmware update. If a partial firmware update is desired, the "YES" branch of decision block 214 is taken and the method proceeds to block 218, as described further below. If a partial firmware update is not desired, the "NO" branch of decision block 214 is taken, and the method ends at block 216.

When the overall power policy and total predicted update time are satisfied, and the "YES" branch of decision block 212 is taken, or when a partial firmware update is desired, and the "YES" branch of decision block 214 is taken, a first firmware update is selected in block 218. A decision is made as to whether or not the power status satisfies the power policy and predicted update time for the selected update in decision block 220. Here, power status information can be requested form the BMC, and one of the firmware update module or the system BIOS can make the determination, similarly to the embodiment shown in block 208, or the update power policy and predicted update time can be sent to the BMC, and the BMC can make the determination, similarly to the embodiment shown in block 210. If the power status does not satisfy either the power policy or the predicted update time, the "NO" branch of decision block 220 is taken, the selected update is reported as having failed in block 222, and the method proceeds to decision block 224, as described further below. If the power status satisfies the power policy and predicted update time for the selected update, the "YES" branch of decision block 220 is taken, and a decision is made as to whether or not the selected update needs to be performed within the system BIOS in decision block 226.

If the selected update does not need to be performed within the system BIOS, the "NO" branch of decision block 222 is taken, the update is executed by one of the firmware update module or the firmware load in block 232, and the method proceeds to block 230, as described further below. If the selected update needs to be performed within the system BIOS, the "YES" branch of decision block 226 is taken and the selected firmware update is passed to the system BIOS and the information handling system is reset in block 228. After the firmware update is executed by the BIOS in block 228, or by the firmware update module or the firmware load in block 232, the selected update is reported as having succeeded in block 230. After the firmware is reported as having failed in block 222 or as having succeeded in block 230, the method proceeds to decision block 224 where a decision is made as to whether or not the selected firmware update is the last firmware update in the firmware load. If not, the "NO" branch of decision block 224 is taken and the method returns to block 218 where a next firmware update of the firmware load is selected. If the selected firmware update is the last firmware update in the firmware load, the "YES" branch of decision block 224 is taken and the method ends at block 216.

Figure 4:
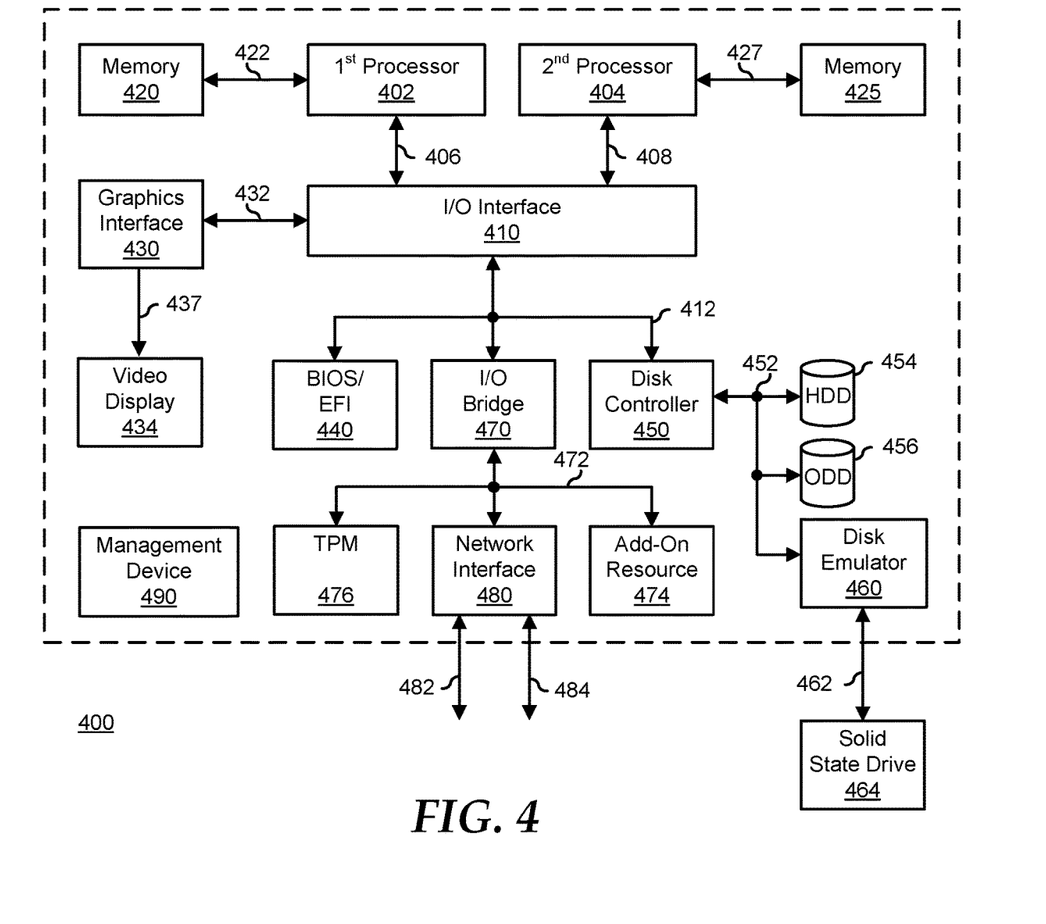
FIG. 4 is a block diagram illustrating a generalized information handling system according to another embodiment of the present disclosure.

Various messages and indications can be provided to a user of the information handling system during the execution of the firmware update. For example, if the power status indications demonstrate that none of the external power sources are connected, the user can be advised to plug in one of the external power sources. In order to proceed with the firmware update. Here, if no user response is given and no external power source is connected within a predetermined time, the execution of the firmware update can be halted, and an indication can be given to that effect. In another example, where an external power source is connected, but the battery retains insufficient charge to back up the firmware update, an indication can be provided to the user that the firmware update will be postponed until the battery retains sufficient charge. However, if the battery is not being charged, then the execution of the firmware update can be halted, and an indication can be given to that effect FIG. 4 illustrates a generalized embodiment of an information handling system 400 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a plurality of power inputs, each of which, when coupled to an associated power source, provides power to the information handling system;
a battery configured to provide power to the information handling system when none of the power inputs are coupled to their associated power source;
a baseboard management controller (BMC) configured to determine which, if any, of the power inputs are coupled to their associated power sources, to provide a first indication as to which of the power inputs are coupled to their associated power sources, and to determine a first duration of time that the battery can provide power to the information handling system when no power input is coupled to its associated power source;
a memory to store a first firmware element; and
a processor configured to receive a first firmware update associated with the first firmware element, wherein the first firmware update includes a second indication as to which, if any, of the power inputs are to be coupled to their associated power source as a condition for the processor to save the first firmware update, and that includes a second duration of time that the processor is expected to take to save the first firmware update;
wherein the information handling system is configured to determine if the first indication matches the second indication and if the first duration of time is greater than the second duration of time, and to direct the processor to save the first firmware update to the memory when the first indication matches the second indication and when the first duration of time is greater than the second duration of time.

2. The information handling system of claim 1, wherein:
the memory is further to store a second firmware element; and
the processor is further configured to receive a second firmware update associated with the second firmware element to the memory, wherein the second firmware update includes a third indication as to which, if any, of the power inputs are to be coupled to their associated power sources as a condition for the processor to save the second firmware update, and that includes a third duration of time that the processor is expected to take to save the second firmware update.

3. The information handling system of claim 2, wherein the information handling system is further configured to determine if the first indication matches the third indication and if the first duration of time is greater than the third duration of time, and to direct the processor to save the second firmware update to the memory when the first indication matches the third indication and when the first duration of time is greater than the third duration of time.

4. The information handling system of claim 2, wherein the information handling system is further configured to determine if the first indication matches both the second and third indications and if the first duration of time is greater than a sum of the second duration of time and the third duration of time, and to direct the processor to save the first firmware update to the memory when the first indication matches both the second indication and the third indication and when the first duration of time is greater than the sum of the second duration of time and the third duration of time.

5. The information handling system of claim 1, wherein the processor is configured to determine if the first indication matches the second indication and if the first duration of time is greater than the second duration of time.

6. The information handling system of claim 5, wherein the processor is configured to execute Basic Input/Output System (BIOS) code in determining if the first indication matches the second indication and if the first duration of time is greater than the second duration of time.

7. The information handling system of claim 5, wherein the processor is configured to execute code included in the first firmware update in determining if the first indication matches the second indication and if the first duration of time is greater than the second duration of time.

8. The information handling system of claim 1, wherein the BMC is configured to determine if the first indication matches the second indication and if the first duration of time is greater than the second duration of time.

9. A method, comprising:
providing, in an information handling system, a plurality of power inputs, each which, when coupled to an associated power source, provides power to the information handling system;
providing a battery configured to provide power to the information handling system when none of the power inputs are coupled to their associated power source;
determining, by a baseboard management controller (BMC) of the information handling system, which, if any, of the power inputs are coupled to their associated power sources;
providing a first indication as to which of the power inputs are coupled to their associated power sources;
determining a first duration of time that the battery can provide power to the information handling system when no power input is coupled to its associated power source;
receiving a first firmware update associated with a first firmware element stored in a memory of the information handling system, wherein the first firmware update includes a second indication as to which, if any, of the power inputs are to be coupled to their associated power source as a condition for the processor to save the first firmware update, and that includes a second duration of time that the processor is expected to take to save the first firmware update;
determining if the first indication matches the second indication and if the first duration of time is greater than the second duration of time; and
saving the first firmware update to the memory when the first indication matches the second indication and when the first duration of time is greater than the second duration of time.

10. The method of claim 9, further comprising:
receiving a second firmware update associated with a second firmware element stored in the memory, wherein the second firmware update includes a third indication as to which, if any, of the power inputs are to be coupled to their associated power sources as a condition for the processor to save the second firmware update, and that includes a third duration of time that the processor is expected to take to save the second firmware update.

11. The method of claim 10, further comprising:
determining if the first indication matches the third indication and if the first duration of time is greater than the third duration of time; and
saving the second firmware update to the memory when the first indication matches the third indication and when the first duration of time is greater than the third duration of time.

12. The method of claim 10, further comprising:
determining if the first indication matches both the second and third indications and if the first duration of time is greater than a sum of the second duration of time and the third duration of time; and
saving the first firmware update to the memory when the first indication matches both the second indication and the third indication and when the first duration of time is greater than the sum of the second duration of time and the third duration of time.

13. The method of claim 9, wherein determining if the first indication matches the second indication and if the first duration of time is greater than the second duration of time is by the processor.

14. The method of claim 13, wherein in determining if the first indication matches the second indication and if the first duration of time is greater than the second duration of time, the method further comprises executing basic input/output system code.

15. The method of claim 13, wherein in determining if the first indication matches the second indication and if the first duration of time is greater than the second duration of time, the method further comprises executing code included in the first firmware update.

16. The method of claim 9, wherein in determining if the first indication matches the second indication and if the first duration of time is greater than the second duration of time, the method further comprises determining, by the BMC, if the first indication matches the second indication and if the first duration of time is greater than the second duration of time.

17. An information handling system, comprising:
a basic input/output system (BIOS);
a hardware device;
a plurality of power inputs, each of which, when coupled to an associated power source, provides power to the information handling system;
a battery configured to provide power to the information handling system when none of the power inputs are coupled to their associated power source;
a baseboard management controller (BMC) configured to determine which, if any, of the power inputs are coupled to their associated power sources, to provide a first indication as to which of the power inputs are coupled to their associated power sources, and to determine a first duration of time that the battery can provide power to the information handling system when no power input is coupled to its associated power source;
a memory to store a first firmware element associated with the BIOS and a second firmware element associated with the hardware device; and
a processor configured to receive a firmware load including a first firmware update associated with the BIOS to the memory and a second firmware update associated with the hardware device, wherein the firmware load includes a second indication as to which, if any, of the power inputs are to be coupled to their associated power sources as a condition for the processor to save the first firmware update and the second firmware update, and that includes a second duration of time that the processor is expected to take to save the first firmware update and the second firmware update;

wherein the information handling system is configured to determine if the first indication matches the second indication and if the first duration of time is greater than the second duration of time, and to direct the processor to save the first firmware update and the second firmware update to the memory when the first indication matches the second indication and when the first duration of time is greater than the second duration of time.

18. The information handling system of claim 17, wherein the processor is configured to determine if the first indication matches the second indication and if the first duration of time is greater than the second duration of time.

19. The information handling system of claim 18, wherein the processor is configured to execute Basic Input/Output System (BIOS) code in determining if the first indication matches the second indication and if the first duration of time is greater than the second duration of time.

20. The information handling system of claim 17, wherein the BMC is configured to determine if the first indication matches the second indication and if the first duration of time is greater than the second duration of time.

\* \* \* \* \*